United States Patent [19]

Peterson et al.

[11] Patent Number: 4,982,596

[45] Date of Patent: Jan. 8, 1991

[54] DIE FOR MANUFACTURING A FASTENER BLANK

[75] Inventors: Francis C. Peterson, Woodbury; Dennis Buss, Thomaston, both of Conn.

[73] Assignee: Buell Industries, Inc., Waterbury, Conn.

[21] Appl. No.: 470,920

[22] Filed: Jan. 26, 1990

[51] Int. Cl.⁵ .......................... B21K 1/56; B23G 9/00
[52] U.S. Cl. ................................ 72/467; 10/2; 10/24; 72/260
[58] Field of Search .............. 10/2, 4, 7, 9, 10 R, 10/24, 27 R, 27 E; 72/260, 276, 281, 467

[56] References Cited

U.S. PATENT DOCUMENTS

| | | | |
|---|---|---|---|
| 3,024,896 | 3/1962 | Scribner | 72/281 X |
| 3,461,470 | 8/1969 | Cochrum | 10/10 R |
| 3,803,889 | 4/1974 | Muenchinger | 72/88 |
| 3,835,495 | 9/1974 | Sygnator | 10/2 |
| 4,095,449 | 6/1978 | Roach et al. | 72/467 X |
| 4,377,943 | 3/1983 | Fuchs | 72/467 |

FOREIGN PATENT DOCUMENTS

| | | | |
|---|---|---|---|
| 453641 | 12/1927 | Fed. Rep. of Germany | 10/24 |
| 577930 | 6/1933 | Fed. Rep. of Germany | 10/27 E |

*Primary Examiner*—E. Michael Combs
*Attorney, Agent, or Firm*—St. Onge Steward Johnston & Reens

[57] ABSTRACT

A die (20) particularly adapted for making a screw blank having a reduced diameter, offset or asymmetric section has a first die section (30) having a central bore (32), which mates with a second die section (50) having a smaller diameter and/or offset bore (52). A shaped end (57) of the smaller or offset bore (52), which forms the reduced diameter, offset or asymmetric section of a screw blank, is coated with a hard lubricating material. The method of manufacturing the die (20) involves making two first die sections (30), which are preferably identical, from a first die body (130), and two second die sections (50), which are also preferably identical and adapted to mate with the first die section (30), from a second die body (150).

24 Claims, 2 Drawing Sheets

DIE FOR MANUFACTURING A FASTENER BLANK

FIELD OF THE INVENTION

The present invention relates to a die and method of manufacturing a die used to make a fastener blank.

BACKGROUND OF THE INVENTION

Screw fasteners are generally manufactured by cold heading methods in which steel wire is transformed by pressure in a die to form a screw blank. Typically the cold heading process involves impacting the wire in a blank forming die. Such dies are typically made from hard steel such as carbide steel. For a standard screw fastener with a straight shank such dies will be a unitary die having a straight bore formed by electric discharge machining or drilling with a diamond tip drill. These dies typically have an operating life of about 200,000 pieces.

However, where a fastener blank with a reduced, asymmetric or offset tip or other section is desired, these unitary dies have a much more limited operating life, due to the stresses on the surfaces of the die which form the tip section. In particular, the surfaces which are other than parallel to the direction of the impact forces will be most subject to repetitive wear and tear, both from the shock of the extrusion impact and abrasion as the wire is extruded through the tip section forming area of the die. These specialized dies often have a limited operating life of as few as about 20,000 pieces.

To enhance the operating life of such a die, it would be desirable to apply a hard coating to the particular surfaces of the die which are subject to stress and wear. However, it is often extremely difficult to selectively apply such a coating only to the selected areas, particularly tip section forming areas, because they are located deep within the die. It is to be appreciated that the bore of a die will often be small in diameter and very deep relative to the bore diameter and it is difficult to introduce coating materials into the bore and cause them to coat the tip forming areas in the bottom of the bore.

SUMMARY OF THE INVENTION

It is an object of the invention to provide a die and method of manufacturing a die which readily allows the application of a hard coating to its recesses, providing a die with a substantially longer operating life than a unitary die.

It is a further object of the invention to provide a die and method of manufacturing a die that provides duplicate die sets in one manufacturing method.

It is a further object of the invention to provide a die and method of manufacturing a die that provides a die particularly adapted for manufacture of specialty fasteners having a reduced diameter or asymmetric or offset tip section.

In accordance with the invention, a die for manufacturing a fastener blank with a reduced, asymmetric or offset tip section, comprises two separate die sections which are mated together to form the die, one of the die sections having a coating of a hard material on at least the stress bearing areas of the die. A first die section has a first bore therethrough and a free end and a joining end. A separate second die section has a second bore therethrough and a free end and a joining end. The first and second bores join to form a single die bore when the die sections are mated together at their joining ends. The end of the second bore at the second die section joining end is shaped to form the reduced, asymmetric or offset section of the fastener blank. The hard material coats the shaped second bore end.

The method of manufacturing a die in accordance with the invention allows duplicate die sets to be made simultaneously. The method comprises the steps of forming a first bore of uniform cross-section in a first die body; forming a second bore of uniform cross-section in a second die body, the second bore having a diameter less than the diameter of the first bore; dividing the first die body into two first die sections each having a free end and a joining end; dividing the second die body into two second die sections each having a free end and a joining end which is adapted to fit with the joining end of one of the first die sections; shaping each second bore end at the second die section joining ends into a desired shape for forming a reduced, asymmetric or offset section in a fastener blank; coating the shaped second bore end with a layer of a hard material; assembling one of the first die sections with a second die section which has a joining end which matches the joining end of the one first die section; and assembling the other of the first die sections with the other second die section which has a joining end which matches the joining end of the other first die section.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENT

The present invention provides a die and method of manufacturing a die used in making a fastener blank, and is particularly adapted to the manufacture of fasteners of the type disclosed in U.S. Pat. No. 4,789,288, entitled "Anti-Cross Threading Screw" and in U.S. patent application Ser. No. 07/234,891, filed Aug. 22, 1988 and entitled "Anti-Cross Threading Fastener", the disclosures of which are hereby incorporated by reference.

Figure 1:
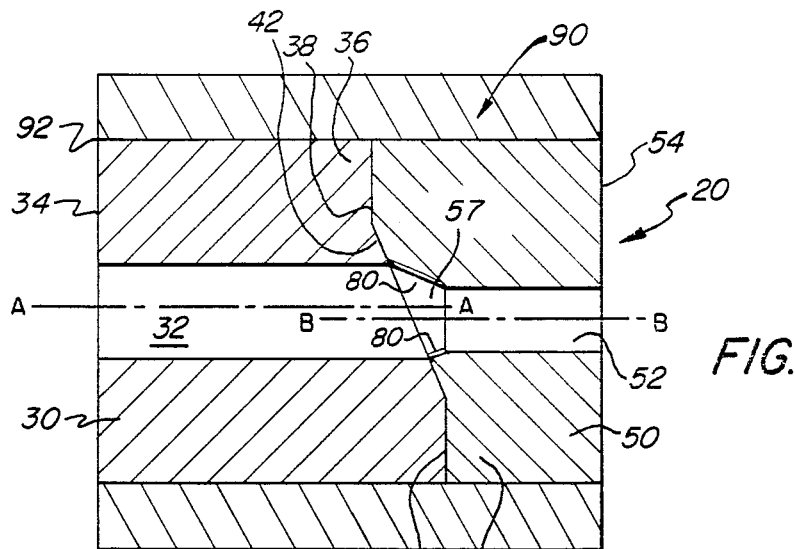
FIG. 1 is a cross-sectional view of an assembled die in accordance with the invention.

Referring now to FIG. 1, a die 20 is shown. Die 20 is adapted for manufacturing a fastener blank with a reduced, asymmetric or offset tip section. Die 20 comprises two die sections 30 and 50 adapted to mate together. The first die section 30 has a first bore 32 therethrough having a central axis A—A, and a free end 34 and a joining end 36.

The separate second die section 50 has a second bore 52 therethrough. Bore 52 has a central axis B—B. The diameter of bore 52 is less than the diameter of the first bore 32. The second die section 50 has a free end 54 and a joining end 56. Joining end 56 is adapted to seat against the first die section joining end 36. The bore end 57 of the second bore 52 at the second die section joining end 56 is shaped to form the reduced, asymmetric or offset tip section of the fastener blank which will be made in the die 20.

A coating 80 of a hard material coats the shaped second bore end 57. The coating of hard material is most preferably a coating of titanium nitride having a thickness of at least 0.0001 inch, and preferably in the range of about 0.0001–0.0005 inch.

In order for each die section to register with the other, the joining ends 36 and 56 of the first and second die sections 30 and 50 have non-planar interfitting faces.

In one preferred embodiment, the non-planar joining ends both comprise substantially parallel planar sections connected by a third planar section which intersects the two parallel planar sections. Referring to FIG. 1, the first die section joining end 36 has two substantially parallel planar sections 38 and 40 connected by a third planar section 42. The first bore 32 in this embodiment intersects the third planar section 42. The second die joining end 56 has two substantially parallel planar sections 58 and 60 connected by a third planar section 62 which intersects the two substantially parallel planar sections 58 and 60 in a mirror image of the joining end 36. The second bore 52 thus also intersects the third planar section 62.

In a most preferred embodiment, the two parallel planar sections 38 and 40 of the first die section 30 5 are substantially perpendicular to the axis A—A of the first bore 32. Similarly, the two parallel planar sections 58 and 60 of the second die section 50 are substantially perpendicular to the axis B—B of the second bore 52.

In a preferred embodiment for making anti-cross threading screws, at least a portion of the shaped second bore end 57 is bevelled, and the diameter of the bevelled second bore end 57 is about equal to the diameter of the first bore 32. The bevelled end 57 tapers to join the smaller diameter bore 52. The second bore bevelled end 57 is located against the first bore 32 such that the first and second bores 32 and 52 form a smooth continuous bore. In this embodiment, the second bore 52 has a central axis B—B which is offset from the first bore axis A—A, and the second bore axis B—B and second bore diameter $D_2$ are selected and sized such that the second bore 52 lies within the diameter $D_1$ of the first bore 32. In other words, the second bore 52 lies within the diameter $D_1$ of an imaginary projection of the first bore 32. In this preferred embodiment, the diameter $D_2$ of the second bore 52 will be usually about 60 to about 80 percent of the diameter $D_1$ of the first bore 32, and the axis B—B of the second bore 52 is four to about twelve percent of the diameter $D_1$ of the first bore 32. More preferably, the axis B—B of the second bore 52 is offset from the axis A—A of the first bore 32 by about six to about ten percent of the diameter $D_1$ of the first bore 32. Most preferably, the axis B—B of the second bore 52 is offset from the axis A—A of the first bore 32 by about eight percent of the diameter $D_1$ of the first bore 32.

It is to be appreciated however, that the present invention has application to fasteners other than an anti-cross threading screw, and, depending on the particular fastener tip section shape to be formed by the die, other relative diameters and axial offsets may be desired, and may be determined as necessary by the practitioner.

Means for retaining the first and second die sections together are preferably provided, and in one embodiment comprise a sleeve die 90 into which the first and second die sections 30 and 50 fit snugly. It is generally preferable that the die 20, and hence the die sections 30 and 50 be generally cylindrical, i.e., circular in cross-section, and the sleeve die 90 would thus have a cylindrical bore 92 into which the die sections would be fitted.

The die 20 of the present invention will be formed of carbide steel. The method of manufacturing the die 20 allows the simultaneous manufacture of two identical die sets. Reference is made to FIGS. 2–5 which relate to the method of manufacturing as set forth hereafter.

Figure 2:
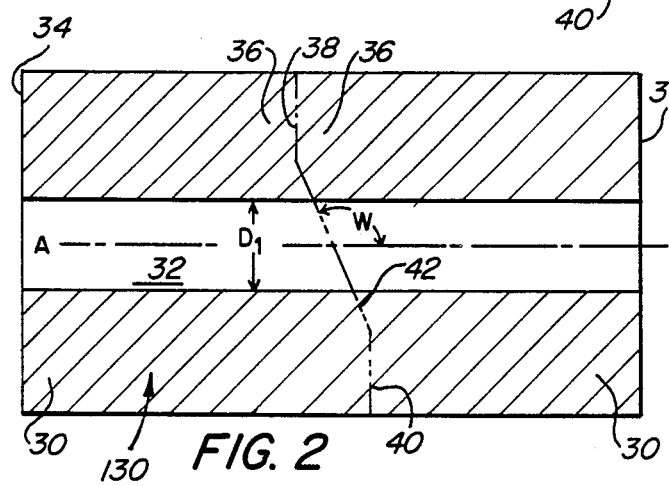
FIG. 2 is a cross-sectional view of a first die body.
Figure 4:
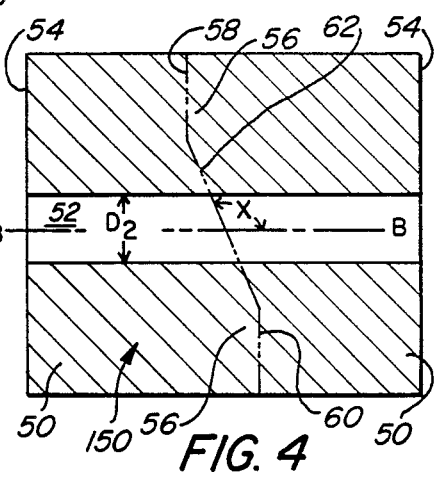
FIG. 4 is a cross-sectional view of a second die body.

The method of manufacturing dies for manufacturing a fastener blank having a reduced, asymmetric or offset tip section is as follows. A first bore 132 is formed in a first die body 130, as seen in FIG. 2. First bore 132 has a central axis A—A and a diameter $D_1$. A second bore 152 is formed in a second die body 150 as seen in FIG. 4. Second bore 152 has a central axis B—B and a diameter $D_2$ which is less than the diameter $D_1$ of the first bore 132. In each case the boring step may be performed by a diamond tipped drill, or by electric discharge machining, or other techniques as are or will be known in the art.

Figure 3:
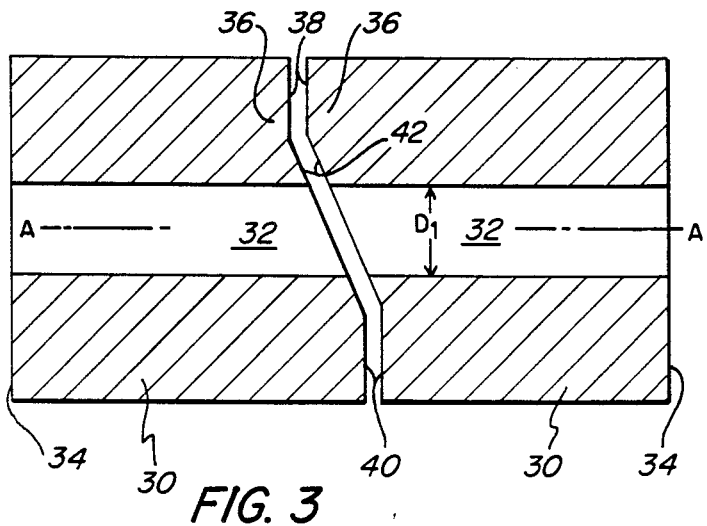
FIG. 3 is a cross-sectional view of a first die body divided into two first die sections.
Figure 5:
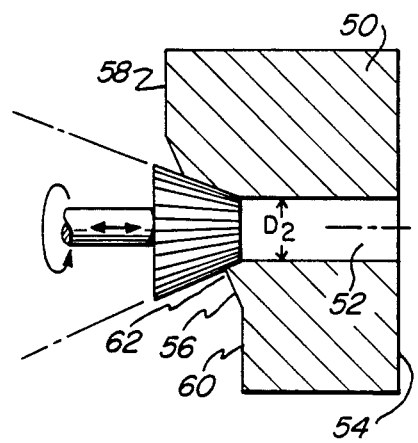
FIG. 5 is a cross-sectional view of a second die section showing the step of bevelling the second bore end.
Figure 6:
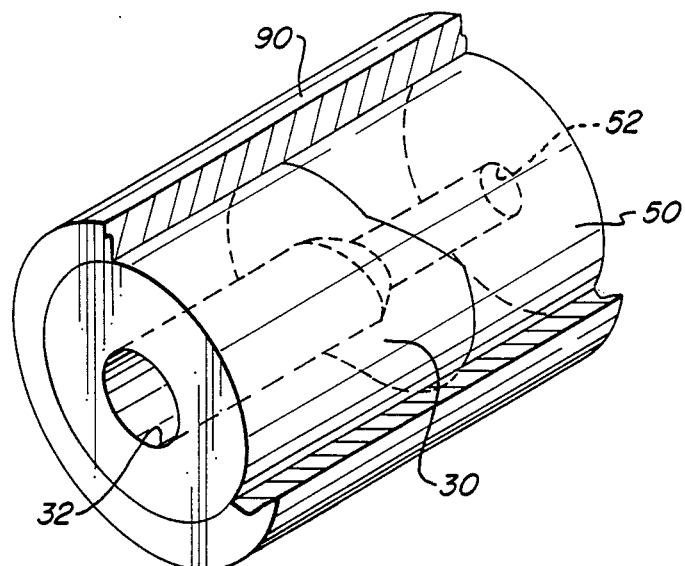
FIG. 6 is a perspective view of an assembled die in accordance with the invention.

The first die body 130 is divided into two first die sections 30 each having a free end 34 and a joining end 36, as shown in FIG. 3.

The second die body 150 is also divided into two second die sections 50 each also having a free end 54 and a joining end 56 which is adapted to fit with at least one of the joining ends 36 of the first die sections 30.

The dividing of the die bodies 130 and 150 is preferably performed by electric discharge machining.

It is preferable that when a die body such as die body 130 or 150 is divided, that it be divided in such a way as to obtain two identical pieces. This allows for interchangeability of die sections.

In the preferred embodiment, the first and second die bodies 130 and 150 are divided such that the joining ends 36 and 56 of the first and second die bodies 30 and 50 are non-planar. In a more preferred embodiment, the first body 130 is divided such that the first die sections 30 have joining ends 36 comprising two substantially parallel planar sections 38 and 40 connected by a third planar section 42 intersecting the two substantially parallel planar sections 38 and 40 and the first bore 32. The third planar section 42 preferably intersects the axis A—A of the first bore 132 at an angle. Most preferably, the angle of intersection W is about 55–75 degrees, and more preferably about 60–70 degrees, and most preferably about 66–67 degrees. The second die section 50 joining end 56 similarly comprises two substantially parallel planar sections 58 and 60 connected by a third planar section 62 intersecting the two substantially parallel planar sections 58 and 60 and the second bore 52. The third planar section 62 preferably intersects the axis B—B of bore 152 at an angle. Most preferably the angle of intersection X is about 55–75 degrees, and more preferably about 60–70 degrees, and most preferably about 66–67 degrees. In a most preferred embodiment, the two parallel planar sections 38 and 40 of the first die section joining ends 36 are substantially perpendicular to the axis A—A of the first bore 32, and the two parallel planar sections 58 and 60 of the second die sections are substantially perpendicular to the axis B—B of the second bore 52.

Each second bore end 57 in the second die sections 50 is shaped into a desired shape for forming a reduced, asymmetric or offset section in a fastener blank. It is to be appreciated that many types of irregular blanks may be desired, and the shaping of the end 57 will reflect the desired blank shape.

In one preferred embodiment for making an anti-cross threading fastener, the shaping step comprises bevelling at least a portion of each second bore joining end 57 such that the diameter of the bevelled second bore end 57 is about equal to the diameter $D_1$ of the first bore 32 of the first die sections 30 and tapers to equal the diameter $D_2$ of the second bore 52 of the second die sections 50. This will form the anti cross thread tip section of the fastener blank for an anti-cross thread fastener. In such case, the bevelling step may be performed by rotating a cutting tool in the second bore joining end 57. This bevelling of the second die section end 57 is particularly effective when the third planar section 62 is angled relative to the second die bore as previously described, as it provides a simple and inexpensive method of obtaining the offset tip shape without resort to complicated machining techniques.

In this preferred embodiment, the second bore 52 has a central axis B—B which is offset from the first bore axis A—A, and the second bore axis B—B and second bore diameter $D_2$ are selected and sized such that the second bore 52 lies within the diameter $D_1$ of the first bore 32. In other words, the second bore 52 lies within the diameter $D_1$ of an imaginary projection of the first bore 32. In this preferred embodiment, the diameter $D_2$ of the second bore 52 will be usually about 60 to about 80 percent of the diameter $D_1$ of the first bore 32, and the the axis B—B of the second bore 52 is offset from the axis A—A of the first bore 32 by about four to about twelve percent of the diameter $D_1$ of the first bore 32. Most preferably the diameter $D_2$ of the second bore 52 is about 75 percent of the diameter $D_1$ of the first bore 32, and the axis B—B of the second bore 52 is offset from the axis A—A of the first bore 32 by about 8 percent of the diameter $D_1$ of the first bore 32.

The shaped second bore end 57 is coated with a layer of a hard material 80 to enhance the operating life of the die 20. Preferably the hard material also has lubricating qualities to reduce the friction between the die and the screw blank to be formed in the die. Most preferably, the hard material comprises a layer of titanium nitride having a thickness of at least 0.0001 inch. Such a material may be coated on the shaped second bore end 57 by vapor deposition processes in which the coating is applied with about a 600 Volt differential in a vacuum chamber.

The first die sections 30 are then assembled with the second die sections 50. Since the particular embodiment shown in the Figures provides two identical first die sections 30 and two identical second die sections 50, any die section 30 may be mated with any die section 50 to obtain a complete die 20. However, if the dividing faces of the die sections provide other than identical die sections, then the particular matching die sections which are matable will be assembled together.

It is to be appreciated that the foregoing description of the preferred embodiment is not limiting of the invention, which encompasses dies for all kinds of irregular screw blank shapes. For example, the invention has application where the screw has irregular, asymmetric or offset shank sections as well as tip sections. The invention may also be extended to situations where more than two die sections are desired. For example, the invention would apply to a multi-section die such as a three section die.

It has been found that the die of the present invention has an operating life in excess of about 200,000 pieces, which is commensurate with the operating life of a die for making a standard straight screw fastener, and is substantially in excess of the operating life of prior dies for making fasteners with a reduced diameter, asymmetric or offset section. Accordingly, the invention provides a new and useful die and method of manufacture thereof that improves manufacturing efficiency and utility.

We claim:

1. A die for manufacturing a fastener blank with a reduced, asymmetric or offset section, comprising:
    a first die section having a first bore therethrough, said first bore having a central axis and a diameter, said first die section having a free end and a non-planar joining end wherein said first die section joining end comprises two substantially parallel planar section connected by a third planar section intersecting said two substantially parallel planar sections, said first bore intersecting said third planar section of said first die section joining end;
    a separate second die section having a second core therethrough, said second die section having a free end and a non-planar joining end adapted to mate with said first die section joining end wherein said second die section joining end comprises two substantially parallel planar sections connected by a third planar section intersecting said two substantially parallel planar sections which match the joining end of said first die section joining end, said second bore intersecting said third planar section of said second die section joining end, the end of said second bore at said second die section joining end being shaped to form said reduced, asymmetric or offset section, said first and second bores forming a unitary bore for forming a fastener blank therein; and
    a layer of a hard material coating at least a portion of said shaped second bore end.

2. A die in accordance with claim 1, wherein at least a portion of said shaped second bore end is bevelled, the diameter of the bevelled second bore end being about equal to the diameter of said first bore, said second bore bevelled end being locatable against said first bore such that said first and second bores form a smooth continuous bore.

3. A die in accordance with claim 2 wherein said second bore has a central axis which is offset from said first bore axis, and said second bore has a diameter which is less than the diameter of said first bore, said second bore axis and second bore diameter being selected such that said second bore lies within the diameter of said first bore.

4. A die in accordance with claim 3 wherein the axis of said second bore is offset from the axis of said first bore by about four to about twelve percent of the diameter of said first bore.

5. A die in accordance with claim 1 wherein said two parallel planar sections of said first die section are substantially perpendicular to the axis of said first bore, and said two parallel planar sections of said second die section are substantially perpendicular to the axis of said second bore.

6. A die in accordance with claim 1 wherein at least a portion of said shaped second bore end is coated with a layer of a material having lubricating qualities.

7. A die in accordance with claim 6 wherein at least a portion of said shaped second bore end is coated with a layer of a titanium nitride having a thickness of at least 0.0001 inch.

8. A die in accordance with claim 1 further comprising means for retaining said first and second die sections together.

9. A die in accordance with claim 8 wherein said first and second die sections are cylindrical, and said retaining means comprises a sleeve having a cylindrical bore, and wherein said die sections fit snugly and are retained in said sleeve cylindrical bore.

10. A die in accordance with claim 1 wherein said third planar section of said first die section intersects said first bore axis at an angle of between about 55 to about 75 degrees.

11. A die for manufacturing a fastener blank with an offset tip section, comprising:
a first die section having a first bore therethrough, said first bore having a central axis and a diameter, said first die section having a free end and a joining end, said first die section joining end being non-planar wherein said first die section joining end comprises two substantially parallel planar sections connected by a third planar section intersecting said two substantially parallel planar sections, said first bore intersecting said third planar section of said first die section joining end;
a second die section having a second bore therethrough, said second bore having a central axis which is offset from said first bore axis and and a diameter which is less than said first bore diameter, said second bore axis and diameter being selected such that said second bore lies within the diameter of said first bore, said second die section having a free end and a joining end which is non-planar and matable with said first die section joining end wherein said second die section joining end comprises two substantially parallel planar section connected by a third planar section intersecting said two substantially parallel planar section which match the joining end of said first die section joining end, said central axis of said second bore intersecting said third planar section of said second die section joining end at an angle, at least a portion of the second bore being bevelled at the second bore end at the joining end of said second die section, the diameter of the bevelled second bore end being about equal to the diameter of said first bore, said second bore bevelled end being located against said first bore such that said first and second bores form a smooth continuous bore;
a layer of a hard material coating at least a portion of said bevelled second bore end; and
means for retaining said first and second die sections together.

12. A die in accordance with claim 11 wherein said two parallel planar sections of said first die section are substantially perpendicular to the axis of said first bore, and said two parallel planar sections of said second die section are substantially perpendicular to the axis of said second bore.

13. A die in accordance with claim 11 wherein said bevelled second bore end is coated with a layer of a material having lubricating qualities.

14. A die in accordance with claim 13 wherein said bevelled second bore end is coated with a layer of a titanium nitride having thickness of at least 0.0001 inch.

15. A die in accordance with claim 11 wherein said first and second die sections are cylindrical, and said retaining means comprises a sleeve having a cylindrical bore, and wherein said die sections fit snugly and are retained in said sleeve cylindrical bore.

16. A die in accordance with claim 13 wherein said third planar section of said first die section intersects said first bore axis at an angle of between about 60 to about 70 degrees.

17. A die in accordance with claim 11 wherein said axis of said second bore is offset from the axis of said first bore by about four to about twelve percent of the diameter of said first bore.

18. A die in accordance with claim 17 wherein said axis of said second bore is offset from the axis of said first bore by about six to about ten percent of the diameter of said first bore.

19. A die for manufacturing a fastener blank with an offset tip section, comprising:
a first die section having a first bore therethrough, said first bore having a central axis and a diameter, said first die section having a free end and a joining end, said first die section joining end comprising two substantially parallel planar sections which are substantially perpendicular to the axis of said first bore and which are connected by a third planar section intersecting said two substantially parallel planar sections and said first bore at an angle of between about 60 to about 70 degrees;
a second die section having a second bore therethrough, said second bore having a central axis which is offset from said first bore axis and and a diameter which is less than said first bore diameter, said second bore axis and diameter being selected such that said second bore lies within the diameter of said first bore, said second die section having a free end and a joining end comprising two substantially parallel planar sections which are substantially perpendicular to the axis of said second bore and are connected by a third planar section intersecting said two substantially parallel planar sections and said second bore at an angle of between about 60 to about 70 degrees, said second die section joining end being matable with the joining end of said first die section joining end, at least a portion of the second bore being bevelled at the second bore end at the joining end of said second die section, the diameter of the bevelled second bore end being about equal to the diameter of said first bore, said second bore bevelled end being located against said first bore such that said first and second bores form a smooth continuous bore;
a layer of a hard material coating said bevelled second bore end; and
means for retaining said first and second die sections together.

20. A die in accordance with claim 19 wherein said bevelled second bore end is coated with a layer of a titanium nitride having thickness of at least 0.0001 inch.

21. A die in accordance with claim 19 wherein said first and second die sections are cylindrical, and said retaining means comprises a sleeve having a cylindrical bore, and wherein said die sections fit snugly and are retained in said sleeve cylindrical bore.

22. A die in accordance with claim 19 wherein said angle between said third planar sections with the bores of said first and second die sections is about 66 to about 67 degrees.

23. A die in accordance with claim 22 wherein said axis of said second bore is offset from the axis of said first bore by about four to about twelve percent of the diameter of said first bore, and the diameter of said second bore is about 60 to about 80 percent of the diameter of said first bore.

24. A die in accordance with claim 23 wherein said axis of said second bore is offset from said axis of said first bore by about 8 percent of the diameter of said first bore.

* * * * *